United States Patent [19]

Olson

[11] 4,125,343
[45] Nov. 14, 1978

[54] PLANETARY BLADE TURBINE

[76] Inventor: Leonard Olson, 107 W. Cheyenne Rd., Colorado Springs, Colo. 80906

[21] Appl. No.: 808,266

[22] Filed: Jun. 20, 1977

[51] Int. Cl.$^2$ .............................................. F03D 7/06
[52] U.S. Cl. ...................................... 416/17; 416/41
[58] Field of Search .................................. 416/17, 41

[56] References Cited

U.S. PATENT DOCUMENTS

| 32,428 | 5/1861 | Maag | 416/17 |
|---|---|---|---|
| 1,154,930 | 9/1915 | Might | 416/17 |
| 1,383,461 | 7/1921 | Giesler | 416/17 |
| 1,408,988 | 3/1922 | Chenoweth | 416/17 |
| 1,568,000 | 12/1925 | Schmidt | 416/17 |
| 1,651,067 | 11/1927 | Nitardy | 416/17 |
| 1,714,808 | 5/1929 | Oliphant | 416/17 |

FOREIGN PATENT DOCUMENTS

| 742,788 | 12/1943 | Fed. Rep. of Germany | 416/17 |
|---|---|---|---|
| 539,171 | 6/1922 | France | 416/17 |

Primary Examiner—Everette A. Powell, Jr.
Attorney, Agent, or Firm—Richard W. Hanes

[57] ABSTRACT

The present invention relates to a fluid motor of the turbine class in which a pair of rotatable blades are carried in orbital revolution around the output shaft of the motor and wherein the blades are operably interconnected to the output shaft and to a weathercock vane so as to present an optimum surface to the driving fluid at all times.

3 Claims, 13 Drawing Figures

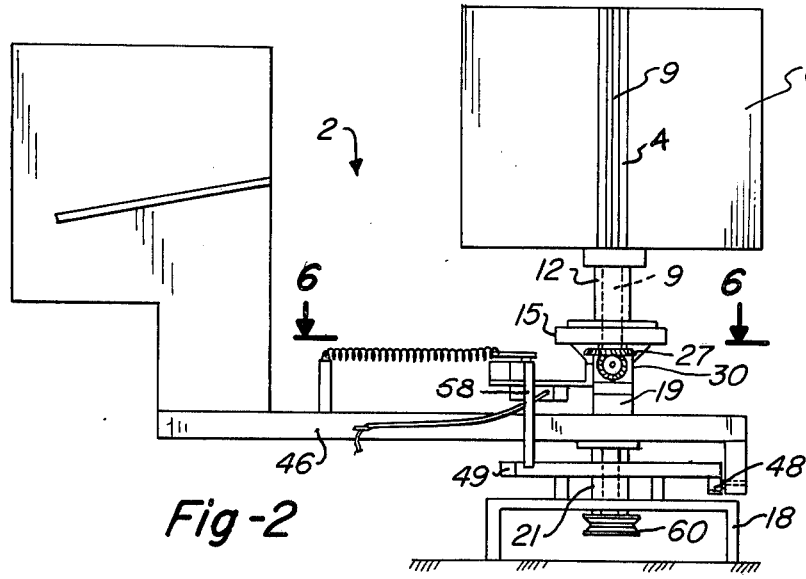
Fig-2
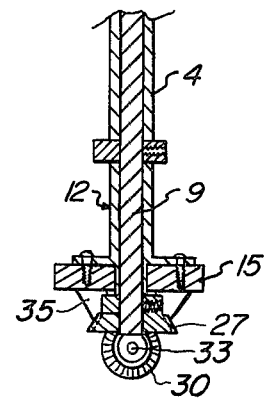
Fig-4
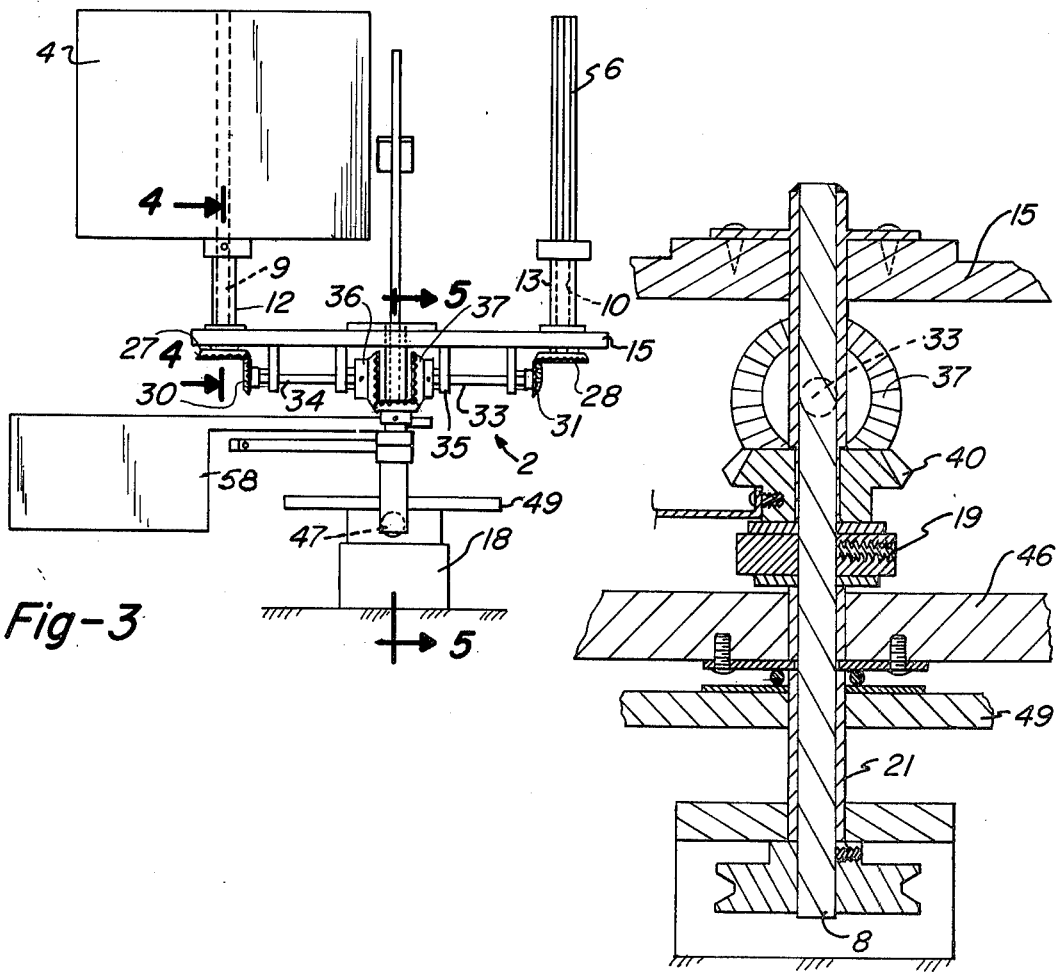
Fig-3
Fig-5

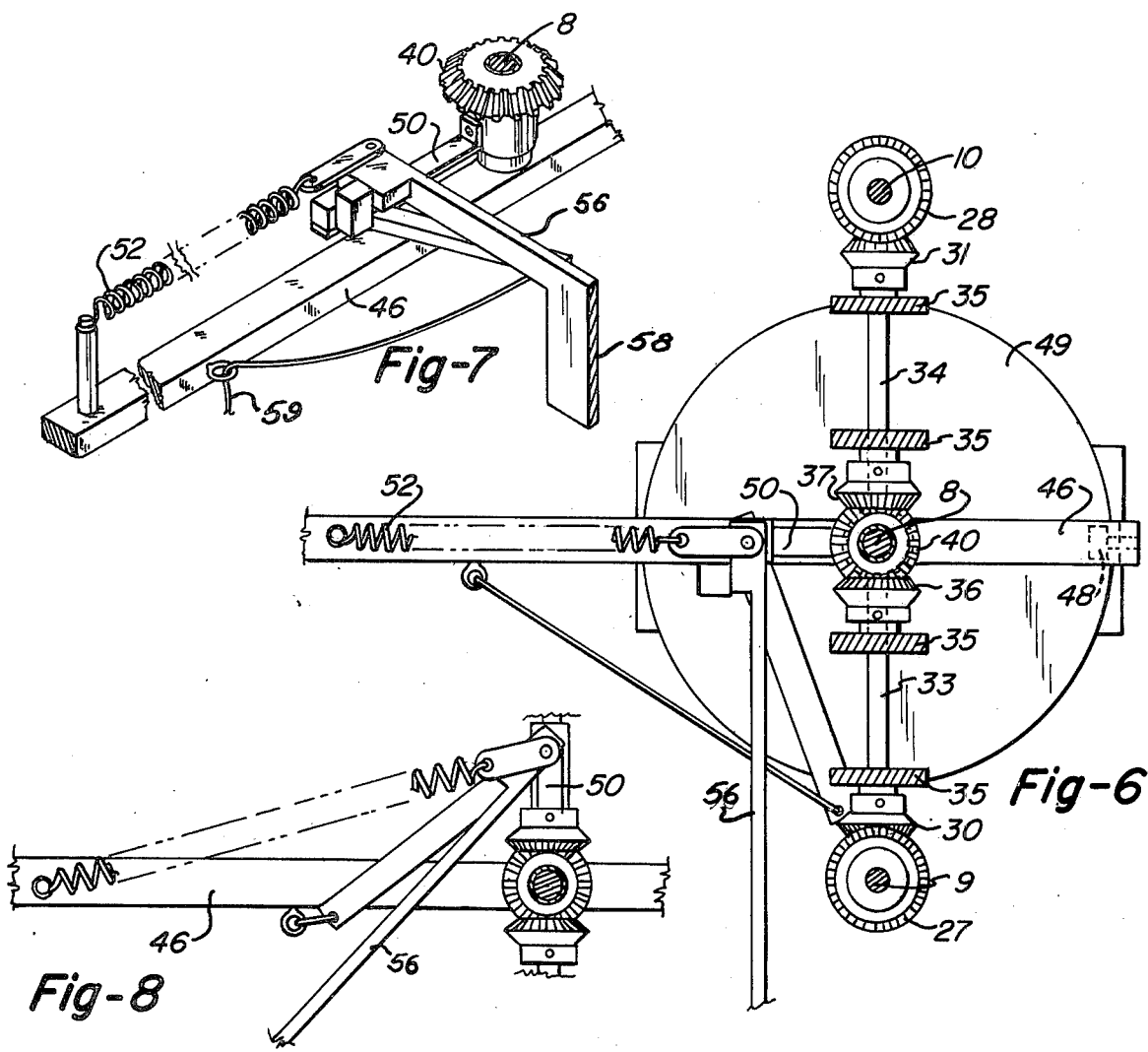
Fig-7
Fig-8
Fig-6
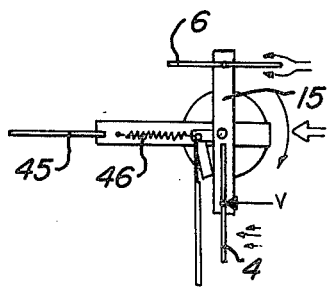
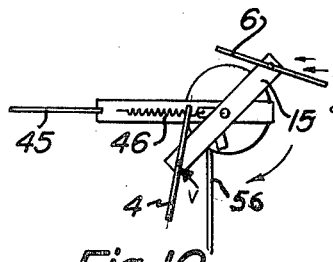
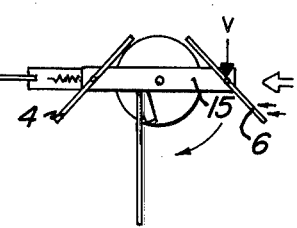
Fig-9
Fig-10
Fig-11
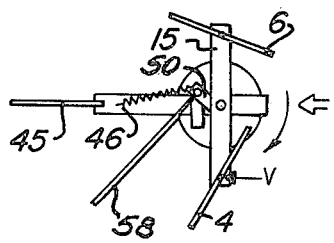
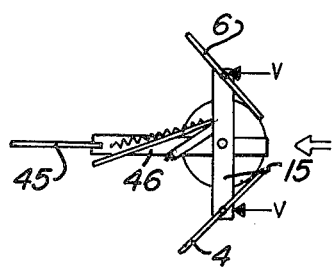
Fig-12
Fig-13

PLANETARY BLADE TURBINE

There have been produced many hydraulic and air motors in which a vaned wheel or runner is made to revolve by the impingement of a passing fluid. Devices such as water wheels and windmills are generally of this class and traditionally comprise structures with fixed vanes or blades. When the vanes are fixed, some provision must be made to create torque about the central axis or output shaft. In a water wheel, for example, the flowing water produces a tangential force on only one side of the wheel, the other side being out of the water. In the typical air motor, the vanes or blades are shaped to produce a single torque producing force component whether the blade be located on one side of the turbine wheel or the other because the moving air strikes both sides similarly.

Regardless of the sophistication of the design of the wind or water driven propeller, however, the angled or bucket shape of the blade, which is necessary to provide the "couple" forces when both sides of the driven wheel are subjected to fluid forces, can never be as effective and as efficient as a flat surface receiving the fluid force perpendicularly.

Hence, it is the primary object of the present invention to provide a fluid motor of the turbine class in which the blade orientation with respect to the turbine wheel is variable so as to present the full surface of the motor blade to the driving fluid on the power side of the wheel revolution and present only an edge profile on the return side of the wheel revolution.

A second and important object of the invention is to provide a device of the class described which will embody means to maintain the orientation of the blades so as to receive the maximum force of the fluid regardless of the direction from which the fluid is flowing.

Other and more specific objects, features and advantages of the present invention will become apparent upon a reading of the following detailed description of a preferred form of the invention having two driving blades and adapted to convert the wind's energy to electrical output through the use of a generator driven by the turbine wheel. The written description shall be read in connection with the accompanying drawings in which:

FIG. 2 is a side elevational view of the fluid motor of the present invention as the apparatus would normally be seen when the fluid force is exerted from right to left.

FIG. 3 is a front elevational view of the fluid motor as the apparatus would be seen looking in the same direction as the fluid force.

FIG. 4 is an enlarged fragmentary cross-sectional view of a blade shaft taken along lines 4—4 of FIG. 3.

FIG. 5 is an enlarged framentary cross-sectional view of the output shaft of the fluid motor taken along lines 5—5 in FIG. 3.

FIG. 6 is a fragmentary cross-sectional plan view of the fluid motor taken along lines 6—6 of FIG. 2.

FIG. 7 is a fragmentary perspective view showing the attachment of the speed control vane to the output shaft mitre gear and the interrelationship between the speed control vane and the weathercock vane arm. The apparatus is shown in the normal position.

FIG. 8 is a top plan view of the apparatus shown in FIG. 7 showing the displacement of the speed control vane.

FIG. 9 is a diagrammatic top plan view of the fluid motor in which the turbine wheel is disposed at an arbitrarily assigned 0° position with the wind or other fluid being directed from a 90° position to the turbine wheel. Vector arrows indicate the component force vectors of the fluid on each of the turbine blades.

FIG. 10 is a progressive view of the apparatus of FIG. 9 showing the turbine wheel rotated to a 45° position and showing the respective positions of the turbine blades.

FIG. 11 is a third progressive view of the apparatus of FIGS. 9 and 10 showing the turbine wheel rotated to a 90° position and showing the respective positions of the turbine blades.

FIG. 12 is a diagrammatic view similar to FIG. 9 with the exception that the speed control vane has been rotated clockwise from its normal position. The difference in turbine blade positions between the speed control vane in its normal position and in its activated position is illustrated by comparing the blade positions of this FIG. 12 with the blade positions of FIG. 9.

FIG. 13 is a diagrammatic view of the turbine wheel at the 0° position and showing the speed control vane manually actuated to a position where the turbine blades are positioned to mutual cancellation of fluid force vectors in order that the fluid motor will be inoperative.

Figure 1:
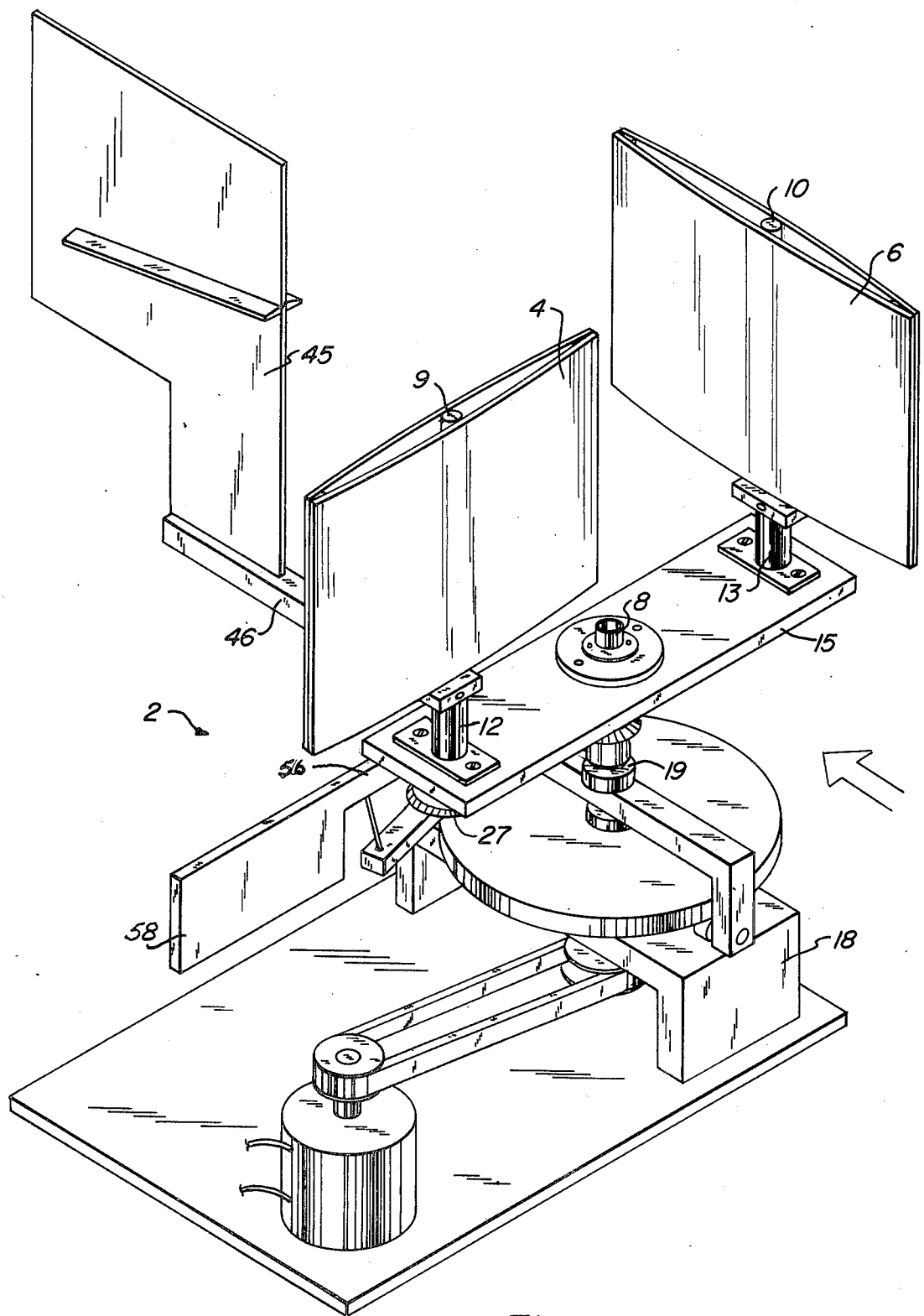
FIG. 1 is a perspective view of the fluid motor of the present invention rigged in a configuration as an air motor and arranged to drive an electrical generator.

To recover the maximum energy from the fluid flowing through the turbine 2 of the present invention, the apparatus utilizes a pair of rotating blades 4 and 6 in orbital planetary relationship to the turbine wheel output shaft 8. Each of the blades 4 and 6 are secured to rotatable shafts 9 and 10 respectively which are journalled in sleeve bearings 12 and 13 rigidly secured to the outer ends of the turbine wheel 15. The output shaft 8 is fixed to the turbine wheel 15 for rotation therewith, both of which are carried by a suitable base 18. The output shaft 8 is held in place by a bearing 19 fixed to the shaft 8 which rotatably engages the upper edge of the shaft supporting sleeve bearing 21. Fluid pressure exerted against the blades 4 and 6 establishes a pair of component forces which act together to produce torque in the turbine wheel 15 and rotate the output shaft 8 to in turn rotate an electrical generator 25 or similar useful load.

As previously pointed out, however, the primary novelty and advantage of the present invention is the ability of the device to present the blades to the fluid in the most efficient way possible through the cycle of the turbine wheel.

Optimum positioning of the blades 4 and 6 is accomplished through the use of gearing or an operatively equivalent transmission system. Preferably, the lower extremity of each of the blade drive shafts 9 and 10 are equipped with a single bevel gear 27 and 28 respectively. Each of these bevel gears engages a bevel gear 30 and 31 respectively which are attached to rotating shafts 33 and 34 disposed perpendicularly to the blade carrying shafts 9 and 10. The shafts 33 and 34 are journalled for rotation in brackets 35 depending from and attached to the turbine wheel 15. Each of the inner ends of the shafts 33 and 34 carry bevel gears 36 and 37 which engage a mitre gear 40 freely rotatably mounted on the turbine output shaft 8 just above the support bearing 19. When the mitre gear 40 is held stationary with respect to the rotating turbine wheel and its output shaft 8, the transmission system developed by the described gears and shaft will produce rotation of each of the blades 4 and 6 with respect to the turbine wheel as the turbine wheel itself rotates. By chosing a two-to-one transmission ratio, one-half revolution (180°) of the turbine wheel results in a 90° revolution of each of the blades, as seen in FIGS. 9, 10 and 11. At the turbine and blade position shown in FIG. 9, blade 4 presents a flat surface to the air pressure, obtaining maximum torque from the wind force at that position, while the other blade 6 has rotated to a position 90° from that of blade 4, presenting only an edge profile and a minimum of drag or counter-torque.

By simple vector analysis, it may be seen that as the turbine or base 15 rotates and the blades start to change position relative to the wind, each of the blades contribute complimentary torque producing forces in the turbine wheel and attached output shaft 8. For example, in the position of the blades in FIG. 10, blade 4 is producing the greatest component of tangential force while blade 6 is producing only a small amount. When the turbine wheel 15 has assumed the position of FIG. 11, both blades would theoretically be producing an equal component of thrust, however the shadow effect of blade 6 on blade 4 may cause unequal force generation. As the turbine wheel 15 continues to turn, the blades will assume the same relative positions as shown in FIG. 9, however it should be noted that for a full revolution of the turbine wheel each of the blades 4 and 6 has made only one-half of one revolution. In this position, the opposite face of blade 4 is presented to the wind from that shown in FIG. 9.

The operation of the turbine blades 4 and 6 just described is premised on the fact that the mitre gear 40 is held stationary with respect to the turbine wheel 15 during rotation of the latter. The method and means for maintaining the mitre gear in such a position reveals another of the novel features of the invention.

A weathercock vane 45 is disposed in a plane perpendicular to the plane of the turbine wheel 15 and is carried at the outer end of a vane mounting arm 46. The vane mounting arm is rotatably mounted on the output shaft by a rigid connection to the shaft sleeve bearing 21. To counterbalance the weight of the vane 45, the mounting arm 46 is cantilevered outwardly from its center of rotation around the output shaft and carries at the end thereof a dependant wheel 48 which rides against the underside of a circular track platform 49.

In the presence of air flow, the vane 45 will assume an edge profile position with respect to the direction of flow in a manner well known and often described as "weathervaning" or "weathercocking."

A control arm 50 and a linearly elastic cord or spring 52 act as an interconnection between the outer portion of the vane mounting arm 46 and the mitre gear 40, as best seen in FIGS. 2, 6 and 7. As the weathercock vane 45 rotates or changes position, the interconnection provided by the control arm 50 and attached spring 52 rotate the mitre gear 40 so that the mitre gear and weathercock normally remain in a substantially fixed relationship to one another. In operation, the weathercock vane 45 and its mounting arm 46 fix the mitre gear 40 in what may be referred to as a reference position. The reference position is that position shown in FIGS. 1 and 9 where the vane 45 is parallel to one blade 6 and perpendicular to the other blade 4 and where the plane of the vane 45 is also perpendicular to the blade transmission shafts 33 and 34.

While the weathercock vane and mitre gear normally assume the aforesaid reference position with respect to the turbine wheel 15, there is provided a speed control device which can override the normal functioning of the weathercock vane and establish a different angular relationship between the vane 45 and the turbine wheel. Such a different relationship is shown in FIGS. 12 and 13. The object of modifying the angular position of the blades relative to the wind is to prevent over-speeding of the turbine during high wind velocities. High wind produces misalignment of the control arm 50 and consequent angular rotation of the mitre gear 40 which changes the "set" of the gear positions, creating blade positions which are less efficient (as shown in FIG. 12) than the best or normal position (as shown in FIG. 9) and achieving a limit to the speed at which the blades can turn the turbine wheel or base 15.

Explaining the function and operation of the over-speed control in more detail, reference is made to the over-speed arm 56 which is fixed to the primary control arm 50 at an angle, but mounted in the same plane as that of the arm 50. Attached to the arm 56 is a paddle or speed brake panel 58. Under what may be referenced as a normal wind condition, the tension in the spring 52 is sufficient to overcome the force moment contributed by the speed brake 58 and applied to the control arm 50 and the spring tension maintains the control arm 50 in alignment with the weathercock vane mounting arm 46 to establish and keep the so-called reference position of mitre gear 40. As the wind force increases above the normal or desired maximum, however, the speed brake force moment exerted on the control arm tends to override the aligning force created by the tension of the spring 52 and the control arm is forced to an angular position with respect to the vane mounting arm 46, thus rotating the mitre gear 40 to rebias or reset the gearing positions. FIG. 12 illustrates such a relationship.

The most extreme position of the speed brake 56 is illustrated in FIG. 13. This position is attained only through the application of an outside force on the speed brake, such as manually induced tension on the line 59. When the speed brake 56 is made to take this extreme position, the mitre gear 40 assumes a position with respect to the wind direction so that the turbine blades 4 and 6 take a position wherein the force exerted on one blade is equal and opposite to the force exerted on the other blade, thus stopping the turbine's rotation entirely. This operating configuration allows for maintenance and repair of the turbine or provides for the shutdown thereof for any reason.

Although the preferred embodiment of the invention has been explained and described in terms of a wind operated turbine motor, the novel concepts of the invention are equally applicable to use in moving water. For example, the output shaft 15 could be connected to a generator mounted in a housing positioned in a river or stream with the turbine wheel and turbine blades depending from the housing into the moving current of water. In such an application, the control arm 50 could be made stationary in alignment with the direction of water flow, thus eliminating the need for the weathercock vane 45 and, assuming the velocity of the moving water was constant or relatively so, the speed control brake 58 could also be eliminated. With the elimination of the weathercock vane and the speed control, the turbine blades 4 and 6 would be biased by the stationary positioning of the control arm 50 and the mitre gear 40 to their optimum or best position for greatest efficiency.

I claim:

1. A fluid motor of the turbine class comprising in combination:
   a rotatable base having an attached output shaft disposed and positioned coincident with the axis of rotation of the base;
   a plurality of blades each rotatably mounted on said base, the axis of rotation of said blades describing a circular path around the said output shaft;
   circular gear means rotatably disposed on said shaft;
   speed transmission means operatively interconnecting the circular gear means and the said rotatable blades;
   weathervane means pivotally mounted on said output shaft and having a vane perpendicular to the said base;
   an elastic interconnection between the weathervane means and the circular gear means; and
   a speed control vane connected to the said elastic interconnection.

2. The apparatus of claim 1 wherein the said elastic interconnection comprises an elastic member and a rigid arm pivotally interconnected, said arm being attached to the circular gear means.

3. The apparatus of claim 2 wherein the speed control vane includes a mounting arm which is attached to the said rigid arm at the point of pivotal interconnection with the said elastic member.

* * * * *